(12) United States Patent
Akita et al.

(10) Patent No.: US 11,396,809 B2
(45) Date of Patent: Jul. 26, 2022

(54) IN-SITU RESERVOIR FLUID ANALYSIS SYSTEM

(71) Applicant: Halliburton Energy Services, Inc., Houston, TX (US)

(72) Inventors: Katrina S. Akita, Cypress, TX (US); Michael T. Pelletier, Houston, TX (US); Megan Pearl, Spring, TX (US); Jing Shen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/481,021

(22) PCT Filed: Nov. 16, 2018

(86) PCT No.: PCT/US2018/061632
§ 371 (c)(1),
(2) Date: Jul. 25, 2019

(87) PCT Pub. No.: WO2020/101710
PCT Pub. Date: May 22, 2020

(65) Prior Publication Data
US 2021/0404335 A1    Dec. 30, 2021

(51) Int. Cl.
*E21B 49/08*    (2006.01)
*C02F 1/461*    (2006.01)
*G01N 27/416*    (2006.01)

(52) U.S. Cl.
CPC ............ *E21B 49/088* (2013.01); *C02F 1/461* (2013.01); *E21B 49/0875* (2020.05); *G01N 27/416* (2013.01)

(58) Field of Classification Search
CPC .... E21B 49/0875; E21B 49/088; C02F 1/461; G01N 27/44743; G01N 27/44756
See application file for complete search history.

(56) References Cited

U.S. PATENT DOCUMENTS

| 4,166,457 | A | * | 9/1979 | Jacobsen | ................ | A61B 5/324 600/397 |
| 5,794,696 | A | * | 8/1998 | Gibson | .................... | E02D 1/06 166/191 |

(Continued)

FOREIGN PATENT DOCUMENTS

WO    2018039072 A1    3/2018

OTHER PUBLICATIONS

International Search Report and Written Opinion dated Aug. 2, 2019; International PCT Application No. PCT/US2018/061632.

(Continued)

*Primary Examiner* — Jennifer H Gay
(74) *Attorney, Agent, or Firm* — McGuireWoods LLP

(57) ABSTRACT

The disclosed embodiments include systems and methods to perform in-situ analysis of reservoir fluids. In some embodiments, the system includes a first vial containing a first insulating cylinder having a first internal cavity for storing electrolytes, a capillary tube, and a first sealable end having a first seal that prevents the electrolytes that are stored in the first internal cavity from flowing through the first sealable end while the first seal remains intact. The system also includes a second vial containing a second insulating cylinder having a second internal cavity for receiving the electrolytes that are stored in the first insulating cylinder, and a second sealable end having a second seal. The system further includes a tube positioned between the first vial and the second vial, where the tube provides at least one fluid flow path between the first vial and the second vial.

20 Claims, 5 Drawing Sheets

(56) References Cited

U.S. PATENT DOCUMENTS

| | | | |
|---|---|---|---|
| 6,780,617 B2* | 8/2004 | Chen | B01L 3/5027 |
| | | | 435/91.2 |
| 8,257,569 B2 | 9/2012 | Shoji et al. | |
| 8,613,845 B2 | 12/2013 | Maxwell et al. | |
| 9,494,553 B2 | 11/2016 | Tanaka et al. | |
| 9,976,417 B2* | 5/2018 | Mahavadi | G01N 27/44782 |
| 10,018,590 B2* | 7/2018 | Mahavadi | E21B 49/087 |
| 2004/0180334 A1 | 9/2004 | Halden | |
| 2013/0071934 A1 | 3/2013 | Indo et al. | |
| 2013/0075093 A1 | 3/2013 | Van Hal et al. | |
| 2015/0047979 A1* | 2/2015 | Mahavadi | G01N 27/44743 |
| | | | 204/453 |
| 2015/0114837 A1* | 4/2015 | Mahavadi | G01N 27/44717 |
| | | | 204/451 |
| 2021/0404335 A1* | 12/2021 | Akita | E21B 49/0875 |

OTHER PUBLICATIONS

Kok, Wim Th, et al. "Characterization of asphaltenes by nonaqueous capillary electrophoresis." Energy & Fuels 25.1 (2011): 208-214.

* cited by examiner

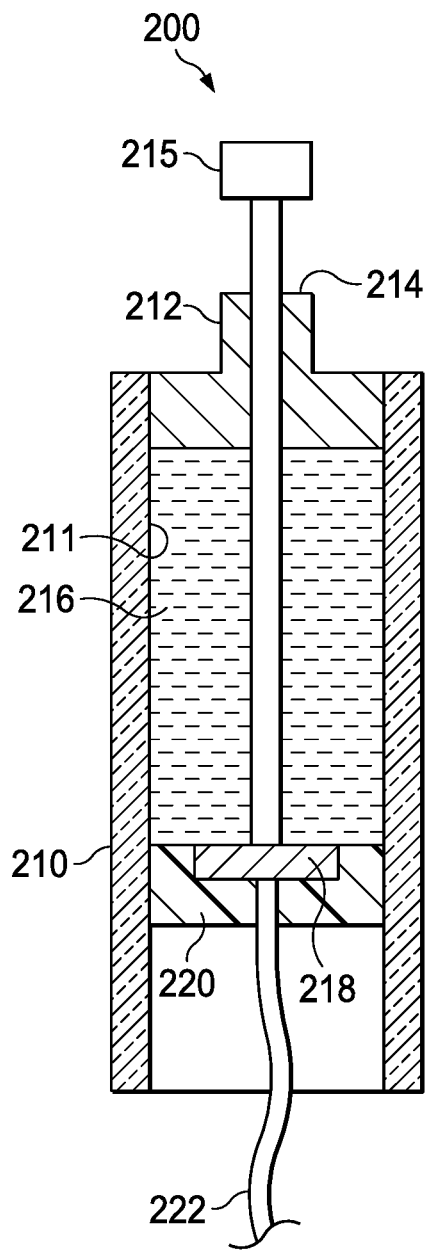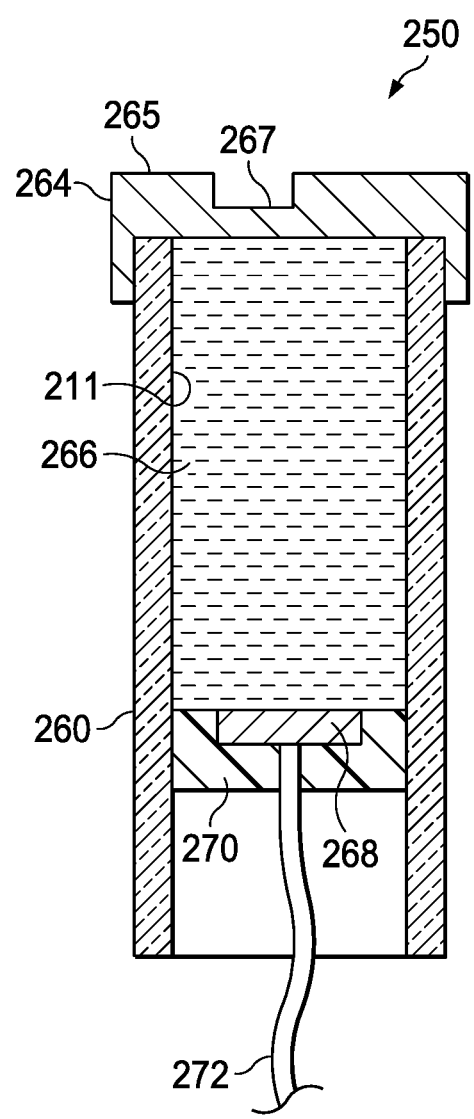
FIG. 2A
FIG. 2B

IN-SITU RESERVOIR FLUID ANALYSIS SYSTEM

BACKGROUND

The present disclosure relates generally to systems and methods to perform in-situ analysis of reservoir fluids.

Reservoir fluids, such as hydrocarbon fluids, are often analyzed to determine material properties of such reservoir fluids, as well as material properties of molecular substances deposited onto such reservoir fluids. Such analysis includes analysis of asphaltene deposition in hydrocarbon resources. Analysis of asphaltene deposition sometimes includes capturing a sample of reservoir fluids in a downhole environment, transporting the sample to a surface-based lab, then performing analysis of the reservoir fluids. However, the time delay associated with transporting the sample of reservoir fluids to a surface-based lab sometimes cause degradation of the sample, thereby reducing the accuracy of the sample.

BRIEF DESCRIPTION OF THE DRAWINGS

Illustrative embodiments of the present disclosure are described in detail below with reference to the attached drawing figures, which are incorporated by reference herein, and wherein:

FIG. 2A is a perspective view of an exemplary vial of the in-situ reservoir fluid analysis system deployed in the wireline environment of FIG. 1A and in the LWD/MWD environment of FIG. 1B;

FIG. 2B is a perspective view of a second vial of the in-situ reservoir fluid analysis system deployed in the wireline environment of FIG. 1A and in the LWD/MWD environment of FIG. 1B;

Figure 1A:
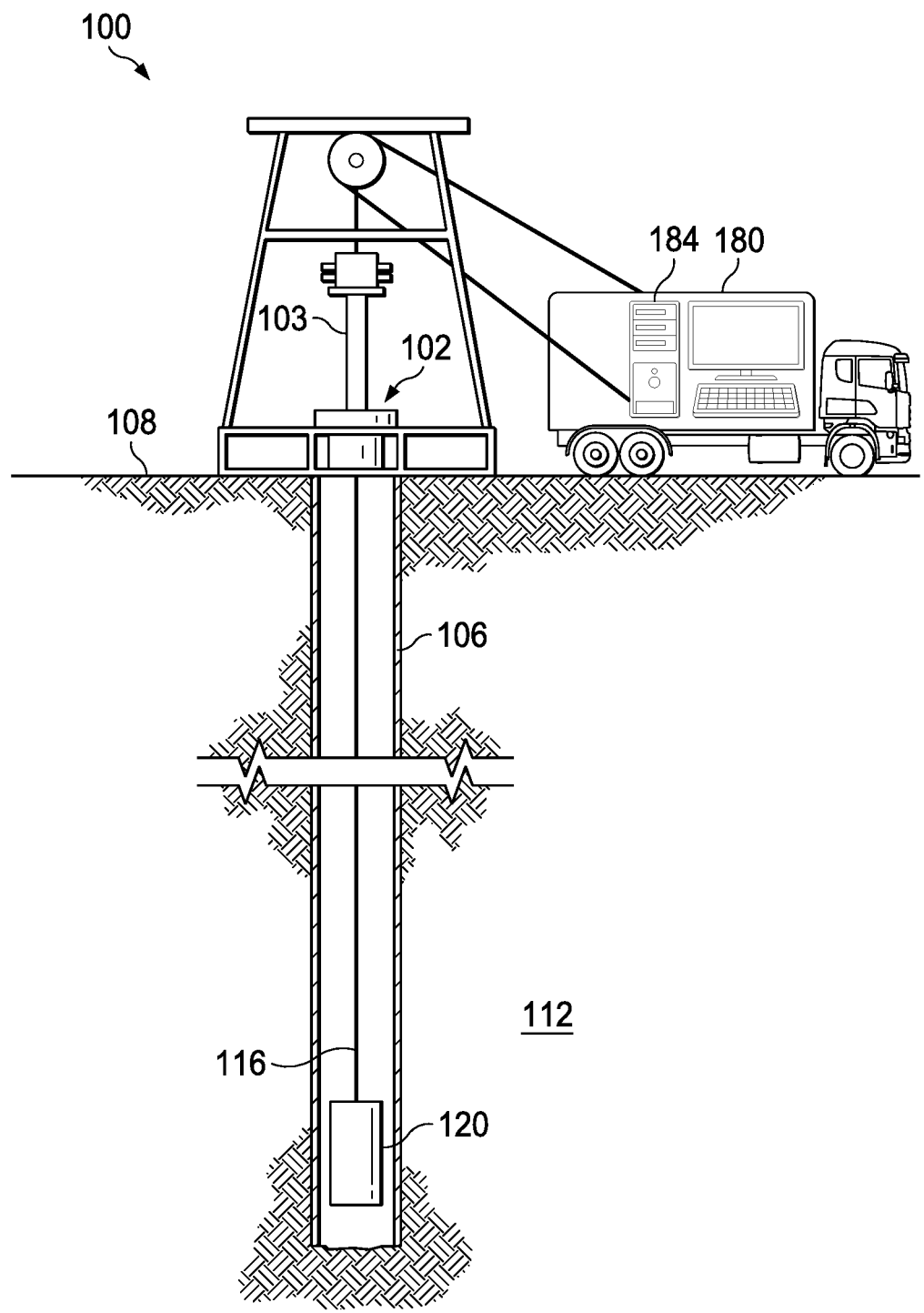
FIG. 1A is a schematic, side view of an in-situ reservoir fluid analysis system deployed in a logging environment.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to systems and methods to perform in-situ analysis of downhole samples (reservoir fluids). More particularly, the present disclosure relates to systems and methods to determine material properties of reservoir fluids in downhole environments. An in-situ reservoir fluid analysis system is deployed in a downhole environment and is utilized to analyze material properties of nearby reservoir fluids as well as the material properties of molecular substances (such as asphaltene) that are deposited onto the reservoir fluids. The in-situ reservoir fluid analysis system includes a first vial having an insulating cylinder formed from materials, such as, but not limited to glass, PEEK, and Teflon. The insulating cylinder has a cavity that is partially filled with electrolytes, such as, but not limited to acetonitrile, tetrahydrofuran, dimethoxyethane, diloxane, or other types of co-solvents. The first vial also includes a sealable end that is initially sealed to prevent the electrolytes from flowing through the sealable end while the sealable end remains sealed. In some embodiments, the sealable end is sealed by a bulbous, or another object that is detachably attached to the sealable end. In one or more embodiments, the bulbous is sheered off the sealable end if a threshold amount of force is applied to the bulbous. The first vial further includes a capillary tube that is fixedly attached to the insulating cylinder.

The in-situ reservoir fluid analysis system also includes a second vial also having an insulating cylinder. The insulating cylinder of the second vial also has a cavity. In some embodiments, the insulating cylinder of the second vial is also partially filled with electrolytes described herein. The second vial also includes a sealable end that is initially sealed. In some embodiments, the seal of the sealable end of the second vial is a T-shaped seal. In some embodiments, the seal of the sealable end of the second vial includes a guide that guides the capillary tube of the first vial to a portion of the second seal, where the capillary tube breaks the seal (or removes the seal) after the capillary tube comes into contact with the seal, thereby allowing the electrolytes initially deposited in the first vial to flow into the second vial.

The in-situ reservoir fluid analysis system further includes a tube that is positioned between the first vial and the second vial. The tube provides fluid flow paths between the first vial and the second vial. The tube also provides fluid flow paths for reservoir fluids to flow into the first vial or the second vial. In some embodiments, the tube includes a fluid flow path for the reservoir fluid to flow into the capillary tube after the seal on the sealable end of the first vial is removed. In other embodiments, the tube also includes a flow path for the electrolytes that are stored in the internal cavity of the first vial to flow into the insulating cylinder of the second vial after molecular substances of the reservoir fluid are deposited on the electrolytes and after the second sealable end is partially removed.

In some embodiments, the in-situ reservoir fluid analysis system is also mechanically coupled to an actuator that drives the first vial towards the second vial. In one or more embodiments, the actuator also drives the electrolytes that are stored in the internal cavity of the first vial to the second vial. In some embodiments, the in-situ reservoir fluid analysis system also includes a current source that is electrically coupled to the first vial and the second vial. In one or more embodiments, current is supplied by the current source when the electrolytes come into contact with the reservoir fluids to cause the molecular substances of the reservoir fluid to deposit onto the electrolytes. In one or more embodiments, the in-situ reservoir fluid analysis system also includes sensors deployed to measure the molecular substances of the reservoir fluid. Examples of measurements made by the sensors include, but are not limited to spectrophotometry, spectroscopy, and refractive index of the molecular substances of the reservoir fluid. Additional details of the foregoing components of the in-situ reservoir fluid analysis system are provided in the paragraphs below.

The seal on the sealable end of the first vial is broken to initiate an in-situ reservoir fluid analysis. After the seal on sealable end is removed, nearby reservoir fluids flow into the capillary tube. In some embodiments, the amount of reservoir fluids that flow into the capillary tube is determined based on thermal expansion of the downhole environment. In other embodiments, the amount of reservoir fluids that flow into the capillary tube is determined based on the compressibility of the capillary tube. In some embodiments, gas bubbles are sealed inside the capillary tube before the seal is removed to facilitate fluid flow of the reservoir fluids into the capillary tube.

Once the capillary tube is filled with a desired amount of the reservoir fluid, the electrolytes that are stored in the insulating cylinder of the first vial are driven to come into contact with the reservoir fluid. In some embodiments, where the first vial is mechanically coupled to an actuator, the actuator mechanically drives the electrolytes into contact with the reservoir fluid. In some embodiments, where the cavity of the first vial also includes a seal that initially prevents contact between the electrolytes and the reservoir fluids, the actuator also drives the electrolytes into the seal, breaking the seal, thereby allowing the electrolytes to come into contact with the reservoir fluids. In other embodiments, the first vial is electrically coupled to an electrical source. In such embodiments, the electrical source applies a current to the electrolytes to drive the electrolytes to come into contact with the reservoir fluid.

After the electrolytes come into contact with the reservoir fluid, an electro-deposition process is initiated to deposit molecular substances of the reservoir fluid onto the electrolytes. In some embodiments, a current is applied to the electrolytes to cause the molecular substances of the reservoir fluid to deposit onto the electrolytes. The first vial is electrically or mechanically driven towards the second vial. In one or more embodiments, the capillary tube of the first vial is guided by the second vial to physically contact the seal of the second vial. In one or more embodiments, the seal of the second vial is broken (or is removed) after the capillary tube physically contacts the seal. Once the seal of the second vial is broken or removed, an electrical charge is applied to facilitate the electrolytes having the molecular substances to migrate from the first vial to the second vial. More particularly, an electrical charge is applied to the electrolytes to generate a potential difference between the first vial and the second vial, where the electrolytes migrate from the first vial to the second vial due to the potential difference. In some embodiments, a physical force (such as from the actuator) is applied to the electrolytes to cause the electrolytes to flow from the first vial into the second vial. In some embodiments, where the tube provides a flow path between the first vial and the second vial, the electrolytes flow along the flow path from the first vial to the second vial.

In some embodiments, the electrolytes are subsequently driven from the second vial back into the first vial. The properties of the molecular substances that have been deposited on the electrolytes are measured. Additional descriptions of the foregoing systems and methods to perform in-situ reservoir fluid analysis are described in the paragraphs below and are illustrated in FIGS. 1-4.

Turning now to the figures, FIG. 1A is a schematic, side view of an in-situ reservoir fluid analysis system 120 deployed in a logging environment 100. FIG. 1A may also represent another completion or preparation environment where a logging operation is performed. In the embodiment of FIG. 1A, a well 102 having the borehole 106 extends from a surface 108 of the well 102 to or through a formation 112. A conveyance 116, optionally carried by a vehicle 180, is positioned proximate to the well 102. The conveyance 116 and the in-situ reservoir fluid analysis system 120 are lowered down the borehole 106, i.e. downhole.

In some embodiments, the conveyance 116 and the in-situ reservoir fluid analysis system 120 are lowered downhole through a blowout preventer 103. In one or more embodiments, the conveyance 116 may be wireline, slickline, coiled tubing, drill pipe, production tubing, fiber optic cable, downhole tractor or another type of conveyance operable to deploy the in-situ reservoir fluid analysis system 120. The conveyance 116 provides mechanical suspension of the in-situ reservoir fluid analysis system 120 as the in-situ reservoir fluid analysis system 120 is deployed downhole. In one or more embodiments, the conveyance 116 also provides power to the in-situ reservoir fluid analysis system 120 as well as other downhole components. In one or more embodiments, the conveyance 116 also provides downhole telemetry. Additional descriptions of telemetry are provided in the paragraphs below. In one or more embodiments, the conveyance 116 also provides a combination of power and downhole telemetry to the in-situ reservoir fluid analysis system 120. For example, where the conveyance 116 is a wireline, coiled tubing (including electro-coiled-tubing), or drill pipe, power and data are transmitted along the conveyance 116 to the in-situ reservoir fluid analysis system 120.

Figure 1B:
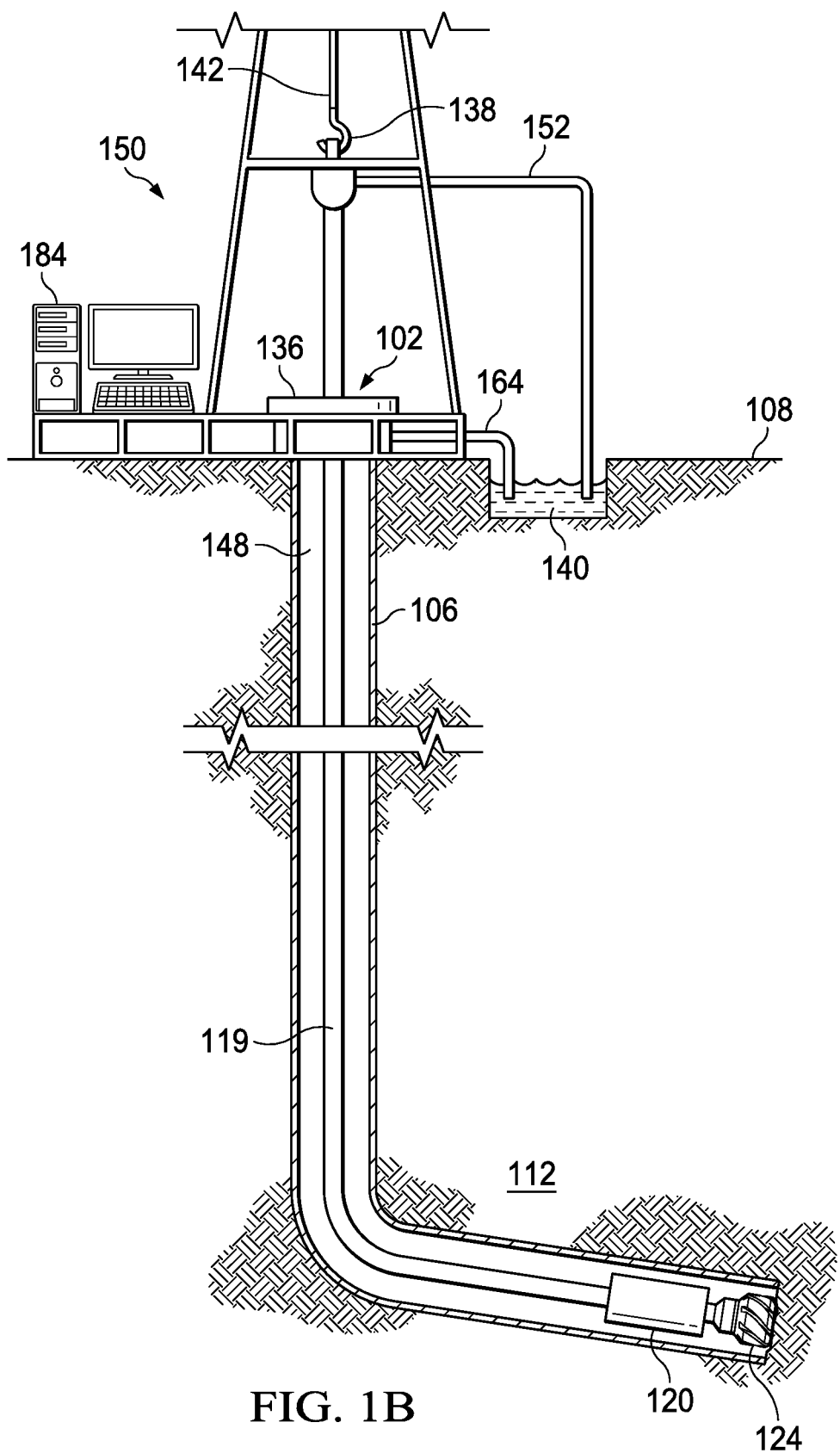
FIG. 1B is a schematic, side view of an in-situ reservoir fluid analysis system of FIG. 1A deployed in a logging while drilling (LWD)/measurement while drilling (MWD) environment.

The in-situ reservoir fluid analysis system 120 includes a first vial (shown in FIG. 2A) and a second vial (shown in FIG. 2B). Additional descriptions and illustrations of the components of the in-situ reservoir fluid analysis system 120 are provided in the paragraphs below and are illustrated in at least FIGS. 2A and 2B. Additional descriptions and illustrations of steps taken to perform in-situ reservoir fluid analysis are illustrated in at least FIGS. 3A-3E and FIG. 4. In some embodiments, the in-situ reservoir fluid analysis system 120 of FIGS. 1A and 1B are deployed on a downhole tool (not shown) or are components of the downhole tool. In such embodiments, the downhole tool includes the first vial, the second vial, and an actuator that drives the first vial towards the second vial. In one or more of such embodiments, the downhole tool includes or is electrically coupled to a current source that supplies current to the first vial and the second vial, where current supplied by the current source causes deposition of reservoir fluid into the first vial, where the reservoir fluid is mixed with the solution. In one or more of such embodiments, current supplied by the current source also powers the downhole tool. In one or more embodiments, the downhole tool also includes a storage medium (not shown) that stores data indicative of the results of the in-situ reservoir fluid analysis system 120. In one or more of such embodiments, data stored in the storage medium are transmitted via a telemetry system to a surface based electronic device, such as controller 184. In other embodiments, where analysis of the reservoir fluid is performed at a surface-based location and is stored on a data storage device (not shown), the data storage device is communicatively connected to the controller 184 and is operable to provide the data to the controller 184. As defined herein, the controller 184 represents any electronic device operable to receive data indicative of an analysis of the reservoir fluid, where the analysis is performed by the in-situ reservoir fluid analysis system 120. In further embodiments, the controller 184 is the data storage device, and is operable to store data indicative of the analysis of the reservoir fluid. An operator may then access the controller 184 to analyze such data.

FIG. 1B is a schematic, side view of an in-situ reservoir fluid analysis system 120 of FIG. 1A deployed in a LWD/MWD environment 150. FIG. 1B may also represent another completion or preparation environment where a drilling operation is performed. A hook 138, cable 142, traveling block (not shown), and hoist (not shown) are provided to lower a drill sting 119 down the borehole 106 or to lift the drill string 119 up from the borehole 106.

At the wellhead 136, an inlet conduit 152 is coupled to a fluid source (not shown) to provide fluids, such as drilling fluids, downhole. The drill string 119 has an internal cavity that provides a fluid flow path from the surface 108 down to the in-situ reservoir fluid analysis system 120. In some embodiments, the fluids travel down the drill string 119, through the in-situ reservoir fluid analysis system 120, and exit the drill string 119 at the drill bit 124. The fluids flow back towards the surface 108 through a wellbore annulus 148 and exit the wellbore annulus 148 via an outlet conduit 164 where the fluids are captured in container 140. In LWD systems, sensors or transducers (not shown) are typically located at the lower end of the drill string 119. In one or more embodiments, sensors employed in LWD applications are built into a cylindrical drill collar that is positioned close to the drill bit 124. While drilling is in progress, these sensors continuously or intermittently monitor predetermined drilling parameters and formation data, and transmit the information to a surface detector by one or more telemetry techniques, including, but not limited to mud pulse telemetry, acoustic telemetry, and electromagnetic wave telemetry. In one or more embodiments, where a mud pulse telemetry system is deployed in the borehole 106 to provide telemetry, telemetry information is transmitted by adjusting the timing or frequency of viable pressure pulses in the drilling fluid that is circulated through the drill string 119 during drilling operations. In one or more embodiments, an acoustic telemetry system that transmits data via vibrations in the tubing wall of the drill string 119 is deployed in the borehole 106 to provide telemetry. More particularly, the vibrations are generated by an acoustic transmitter (not shown) mounted on the drill string 119 and propagate along the drill string 119 to an acoustic receiver (not shown) also mounted on the drill string 119. In one or more embodiments, an electromagnetic wave telemetry system that transmits data using current flows induced in the drill string 119 is deployed in the borehole 106 to provide telemetry. Additional types of telemetry systems, such as electric telemetry or optical telemetry, may also be deployed in the borehole 106 to transmit data, such as data indicative of a fluid analysis performed by the in-situ reservoir fluid analysis system 120 and other downhole components to the controller 184.

Additional descriptions of the operations performed by the in-situ reservoir fluid analysis system 120 are provided in the paragraphs below. Further, additional illustrations of the in-situ reservoir fluid analysis system 120 and similar in-situ reservoir fluid analysis systems are provided in at least FIGS. 2A and 2B. Although FIGS. 1A and 1B each illustrates a single in-situ reservoir fluid analysis system 120 deployed in the borehole 106, multiple in-situ reservoir fluid analysis systems may be simultaneously deployed in the borehole 106 to perform operations described herein.

FIG. 2A is a perspective view of an exemplary vial 200 (first vial) of the in-situ reservoir fluid analysis system 120 deployed in the wireline environment 100 of FIGS. 1A and 1*n* the LWD/MWD environment 150 of FIG. 1B. The first vial 200 includes an insulating cylinder 210 formed from materials, such as, but not limited to glass, PEEK, and Teflon. The insulating cylinder has a cavity 211 that is partially filled with electrolytes 216, such as, but not limited to acetonitrile, tetrahydrofuran, dimethoxyethane, diloxane, or other types of co-solvents. In some embodiments, the cavity 211 is completely filled with the electrolytes 216. The first vial 200 also includes a sealable end 214 that is initially sealed by a bulbous 215, or another object that is detachably attached to the sealable end 214. In one or more embodiments, the bulbous 215 is sheared off the sealable end 214 if a threshold amount of force is applied to the bulbous 215. The first vial 200 further includes a capillary tube 212 that is fixedly attached to the insulating cylinder 210. In the illustrated embodiment, the first vial 200 also includes electrodes 218 that are coupled to a current source 222, and an insulating piston 220. In some embodiments, the first vial 200 is deployed on an actuator (not shown), which applies a force to the first vial 200.

In one or more of such embodiments, force applied by the actuator causes the bulbous 215 to shear off the sealable end 214. In some embodiments, an ultrasonic vibration is applied to the in-situ reservoir fluid analysis system 120 to break the bulbous 215 from the sealable end 214. In further embodiments, the actuator applies a (e.g., hydraulic or mechanical) force to move the electrolytes 216 towards the sealable end 214. In one or more embodiments, where a portion of the cavity is initially sealed off by a seal (not shown) to prevent initial mixture of the electrolytes with the reservoir fluid, force applied by the actuator causes the seal to beak and the electrolytes to mix with the reservoir fluid.

In some embodiments, once the bulbous 215 has been sheered off, a charge is applied (e.g., via the current source) to the electrodes 218. In some embodiments, potential between the electrode 218 and the tool body of the in-situ reservoir fluid analysis system 120 is utilized to electroosmoticly draw a sample of the reservoir fluid into the capillary tube 212. In other embodiments, once the bulbous 215 is sheared off, exposure of the flowing sample of reservoir fluid to the exposed electrolytes 216 allows the reservoir fluid to diffuse into the capillary tube 212. In some embodiments, the current source 222 applies a current to initiate an electro-deposition of molecular substances of the reservoir fluid on the electrolytes 216. In one or more embodiments, where a fluid flow path has been formed between the first vial 200 and the second vial 250 of FIG. 2B, force from the actuator causes the mixture of the electrolytes 216 and the reservoir fluid to flow from the first vial 200, through the flow path, and into the second vial 250.

FIG. 2B is a perspective view of a second vial 250 of the in-situ reservoir fluid analysis system 120 deployed in the wireline environment 100 of FIGS. 1A and 1*n* the LWD/MWD environment 150 of FIG. 1B. In the illustrated embodiment, the second vial 250 also has an insulating cylinder 260. In the illustrated embodiment, the insulating cylinder 260 of the second vial 250 also has a cavity 261 that is also partially filled with electrolytes 266. In some embodiments, the electrolytes 216 in the first vial 200 is similar to the electrolytes 266 in the second vial 250. The second vial 250 also includes a sealable end 264 that is initially sealed. In the illustrated embodiment, the seal of the sealable end 264 of the second vial 250 is a T-shaped seal 265. In some embodiments, the T-shaped seal 265 also includes a guide that guides the capillary tube 212 of the first vial 200 to a sheering portion 267 of the T-shaped seal 265, where the bulbous 215 sheers off the capillary tube 212 after the bulbous 215 comes into contact with the sheering portion 267 of the T-shaped seal 265, thereby allowing the electrolytes 216 initially deposited in the first vial 200 to flow into the second vial 250, and allowing the electrolytes 266 initially deposited in the second vial 250 to flow into the first vial 200. In the illustrated embodiment, the sheering portion 267 of the T-shaped seal 265 has a shape that helps the bulbous 215 to sheer off the capillary tube 212.

In the illustrated embodiment, the second vial 250 also includes electrodes 268 coupled to current source 272, and an insulating piston 270. In some embodiments, the second vial 250 is also deployed on an actuator (not shown). In one or more of such embodiments, the actuator applies a force to the insulating piston 270 to (e.g., hydraulically or mechanically) move the electrolytes 266 towards the sealable end 264. In one or more embodiments, where a fluid flow path has been formed between the second vial 250 and the first vial 200 of FIG. 2A, force from the actuator causes the electrolytes 266 as well as other fluids that have flowed into the second vial 250 to flow out of the second vial 250, through the flow path, and into the first vial 200.

In some embodiments, the in-situ reservoir fluid analysis system 120 includes a detector (not shown) that is deployed along a flow path of the electrolytes 216 or 266. Examples of detectors, include, but are not limited to refractive indexes, spectral detectors, optical absorption detectors, impedance detectors, electro kinetic detectors, or other types of detectors that are operable of detecting the material properties of samples of the reservoir fluid or the material properties of samples of the reservoir fluid that are deposited on the electrolytes 216 or 266. In one or more embodiments, the detector is coupled to the first vial 200 to measure samples of the reservoir fluid (or samples of the reservoir fluid that are coupled to the electrolytes 216) as the reservoir fluid or the electrolytes 216 flow through or past the detector. Similarly, and in another embodiment, the detector is coupled to the second vial 250 to measure samples of the reservoir fluid that are deposited onto the electrolytes 266 (or samples of the reservoir fluid that are coupled to the electrolytes 266) as the reservoir fluid or the electrolytes 266 flow through or past the detector.

FIGS. 3A-3E illustrate an exemplary time sequence of the in-situ reservoir fluid analysis system 120 of FIGS. 2A and 2B, where the first vial 200 of FIG. 2A is actuated across a fluid flowline in region 302. In some embodiments, the fluid flowline is normal to the in-situ reservoir fluid analysis system 120. In the illustrated embodiments of FIGS. 3A-3E, fluid flow of reservoir fluids flow through region 302. In some embodiments, a tube (not shown) is positioned between the first vial 200 and the second vial 250 to provide fluid flow path for reservoir fluids and to provide fluid flow path between the first vial 200 and the second vial 250. In one or more of such embodiments, the tube is a component of the in-situ reservoir fluid analysis system 120.

Figure 3A:
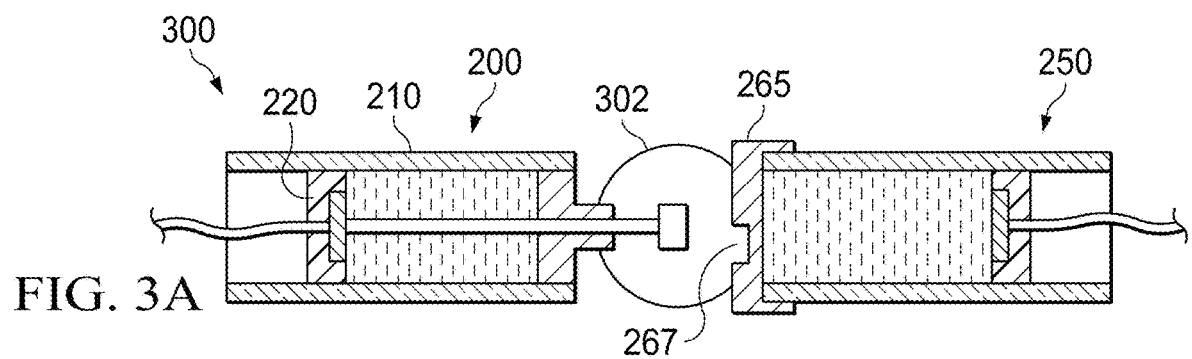
FIG. 3A illustrates an exemplary step to perform an in-situ reservoir fluid analysis.
Figure 3B:
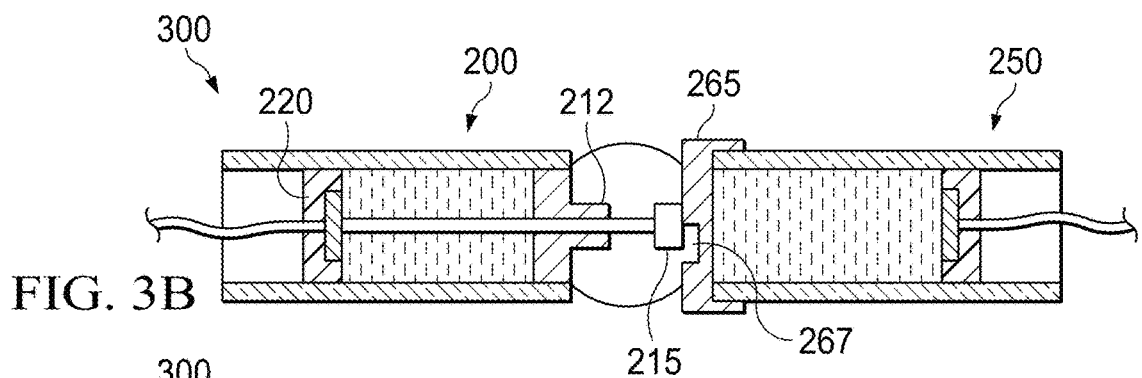
FIG. 3B illustrates another exemplary step to perform an in-situ reservoir fluid analysis.

FIG. 3A illustrates an embodiment of the in-situ reservoir fluid analysis system 120 before any force is applied to the first vial 200. In FIG. 3B, a force is applied to push the first vial 200 towards the second vial 250. As discussed herein, in some embodiments, the piston 220 mechanically or hydraulically pushes the first vial 200 towards the second vial 250. In the some embodiments, where a tube (not shown) is deployed in region 302 to provide fluid flow paths between the first vial 200 and the second vial 250, the tube also includes a guide (not shown) that guides the first vial 200 towards the sheer portion 267 of the T-shaped seal 265. In some embodiments, the bulbous 215 sheers off the capillary tube 212 after coming into contact with the sheer portion 267 of the T-shaped seal 265.

Figure 3C:
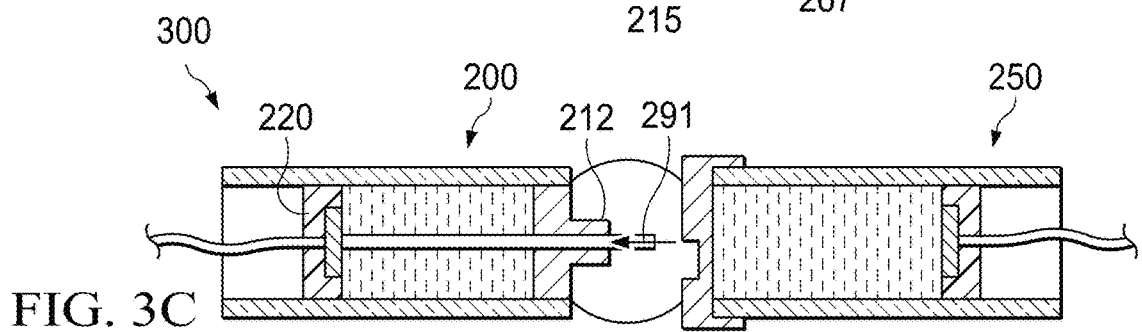
FIG. 3C illustrates another exemplary step to perform an in-situ reservoir fluid analysis.
Figure 3D:
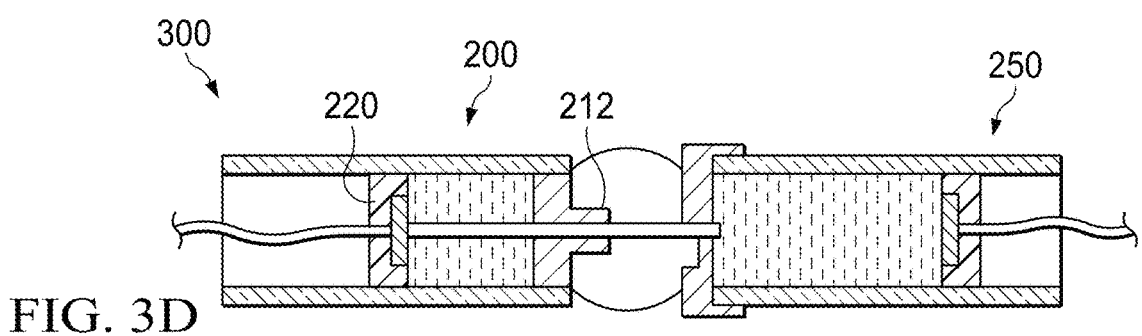
FIG. 3D illustrates another exemplary step to perform an in-situ reservoir fluid analysis.

In FIG. 3C, the bulbous 215 has been removed, thereby allowing reservoir fluid to flow into the capillary tube 212. In some embodiments, an electrical charge is also applied (such as to the first vial 200 or to an area proximate of the first vial 200) to introduce the reservoir fluids along a first fluid flow path indicated by arrow 291 to flow into the capillary tube 212. In some embodiments, where a portion of the insulating cylinder 210 is sealed by a seal (not shown) to prevent mixture of the reservoir fluid with the electrolytes 216, the force from the actuator also breaks the seal to allow mixture of the reservoir fluid with the electrolytes 216. In some embodiments, the current source 222 applies a current to initiate an electro-deposition of molecular substances of the reservoir fluid on the electrolytes 216. In FIG. 3D, the force applied to first vial 200 causes the capillary tube 212 to make contact with the T-shaped seal 265. In some embodiments, the capillary tube 212 punctures the T-shaped seal 265 after the capillary tube 212 makes contact with the T-shaped seal 265.

Figure 3E:
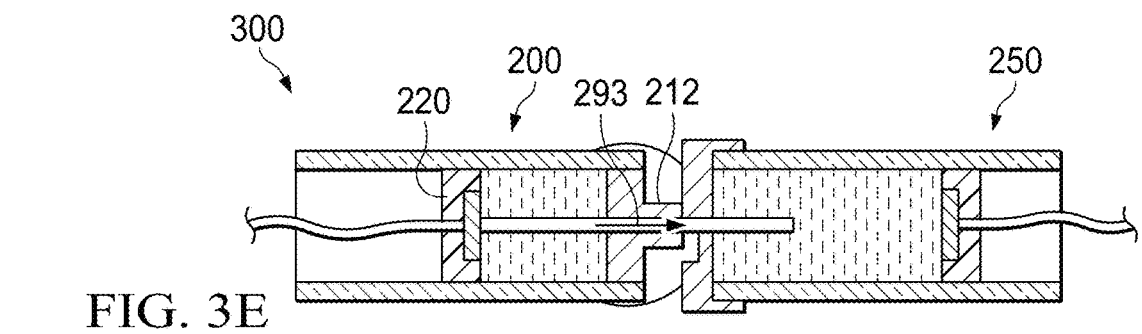
FIG. 3E illustrates another exemplary step to perform an in-situ reservoir fluid analysis.

In FIG. 3E, both the boubous 215 that sealed the capillary tube 212 and the T-shaped seal 265 that sealed the second vial 250 have been removed/broken. The mixture of the reservoir fluid with the electrolytes 216 flows through the capillary tube 212 along a second fluid flow path indicated by arrow 293 and into the second vial 250. In some embodiments, where a tube is deployed in region 302, the tube also provides a fluid flow path for the mixture of the reservoir fluid with the electrolytes 216 to flow from the first vial 200 to the second vial 250. In some embodiments, a force is also applied to the actuator to push the electrolytes 266 to flow from the second vial 250 to the first vial 200. In one or more embodiments, the actuator applies a force after the mixture of the reservoir fluid with the electrolytes 216 has mixed with the electrolytes 266 stored in the second vial 250. In one or more embodiments, both actuators alternatively or simultaneously apply force to facilitate mixture of the reservoir fluid with the electrolytes 216 and 266.

Figure 4:
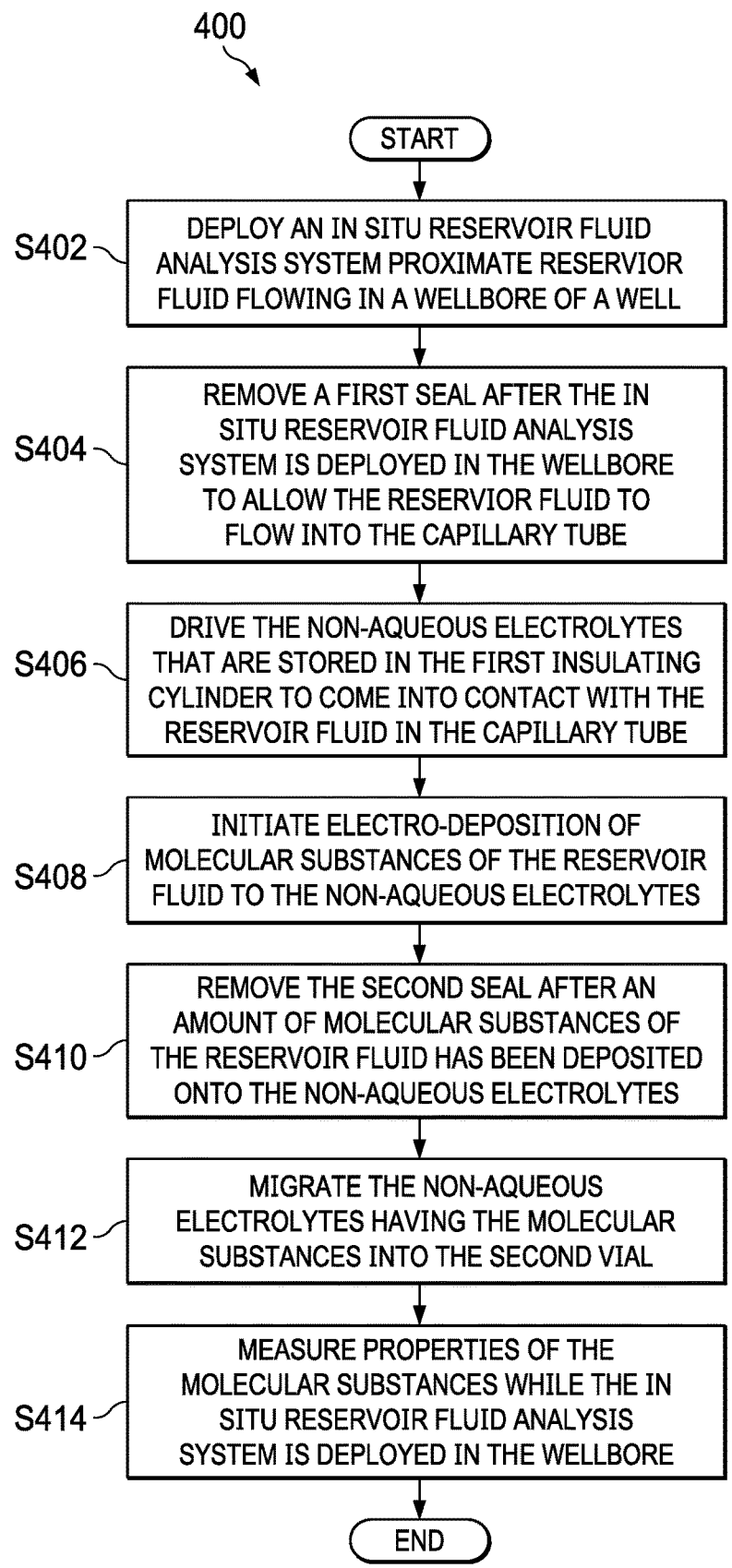
FIG. 4 is a flow chart of a process to perform an in-situ reservoir fluid analysis.

FIG. 4 is a flow chart 400 of a process to perform an in-situ reservoir fluid analysis. Although the operations in the process 400 are shown in a particular sequence, certain operations may be performed in different sequences or at the same time where feasible. At block 5402, an in-situ reservoir fluid analysis system, such as the in-situ reservoir fluid analysis system 120 of FIGS. 1A, 1B, 2A, and 2B is deployed proximate reservoir fluid flowing in wellbore 106 of well 102. As described herein reservoir fluid is any downhole fluid. At block 5404, a seal, such as bulbous 215 of first vial 200 is removed after the in-situ reservoir fluid analysis system 120 is deployed in the wellbore to allow the downhole fluid to flow into a capillary tube, such as the capillary tube 212 of FIG. 2A. At block 5406, the electrolytes 216 that are stored in the insulating cylinder 210 are driven to come into contact with the reservoir fluid in the capillary tube 212.

At block 5408, an electro-deposition of molecular substances of the reservoir fluid on the electrolytes 216 is initiated. In some embodiments, the electro-deposition of the molecular substances naturally occurs once the reservoir fluid comes into contact with the electrolytes 216. In some embodiments, the electro-deposition of molecular substances of the reservoir fluid on the electrolytes 216 is initiated by applying a charge to the electrolytes 216. At block 5410, and after an amount of molecular substances of the reservoir fluid has been deposited onto the electrolytes, the seal on the second vial, such as the T-shaped seal 265 of the second vial 250 of FIG. 2B is removed (or punctured). As shown in FIG. 3D, the T-shaped seal 265 is punctured by the capillary tube 212. At block 5412, the electrolytes 216 having the molecular substances flow into the second vial 250. In some embodiments, the actuator applies a force to facilitate the flow of the electrolytes 216 having the molecular substances of the reservoir fluid into the second vial 250. At block 5414, properties of the molecular substances are measured while the in-situ reservoir fluid analysis system is deployed in the wellbore. In some embodiments, a downhole tool deployed proximate the in-situ reservoir fluid analysis system 120 measures the properties of the molecular substances while the in-situ reservoir fluid analysis system 120 is deployed downhole. In some embodiments, data indicative of the measurements are transmitted via telemetry to controller 184.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure.

Clause 1, an in-situ reservoir fluid analysis system deployed in a wellbore of a well, having a first vial containing a first insulating cylinder having a first internal cavity for storing electrolytes; a capillary tube fixedly attached to the insulating cylinder; and a first sealable end comprising a first seal that prevents the electrolytes that are stored in the first internal cavity from flowing through the first sealable end while the first seal remains intact, wherein after the first seal is removed, molecular substances of a reservoir fluid are deposited onto the electrolytes that are stored in the first internal cavity; and a second vial containing: a second insulating cylinder having a second internal cavity for receiving the electrolytes that are stored in the first insulating cylinder; and a second sealable end comprising a second seal, wherein after the second seal is removed, the electrolytes stored in the first vial flow through the capillary tube, and into the second vial.

Clause 2, the in-situ reservoir fluid analysis system of clause 1, further comprising a tube positioned between the first vial and the second vial, wherein the tube provides at least one fluid flow path between the first vial and the second vial, and wherein the at least one fluid flow path includes a first fluid flow path for a reservoir fluid sample to the capillary tube after the first seal is removed, wherein molecular substances of the reservoir fluid are deposited on the electrolytes that are stored in the first internal cavity after the reservoir fluid comes into contact with the electrolytes that are stored in the first internal cavity; and a second fluid flow path for the electrolytes that are stored in the first internal cavity to flow into the second insulating cylinder after the molecular substances of the reservoir fluid are deposited on the electrolytes that are stored in the first internal cavity and after the second sealable end is partially removed.

Clause 3, the in-situ reservoir fluid analysis system of clause 1 or 2, further including an actuator that drives the first vial towards the second vial, wherein the first seal and the second seal are removed after the first vial is driven towards the second vial.

Clause 4, the in-situ reservoir fluid analysis system of any of clauses 1-3, wherein the actuator comprises electrodes cast in silicone piston.

Clause 5, the in-situ reservoir fluid analysis system of any of clauses 1-4, further comprising a current source, wherein current supplied by the current source causes the molecular substances of the reservoir fluid to deposit onto the electrolytes.

Clause 6, the in-situ reservoir fluid analysis system of any of clauses 1-5, further including at least one sensor operable to measure the molecular substances of the reservoir fluid.

Clause 7, the in-situ reservoir fluid analysis system of any of clauses 1-6, wherein the at least one sensor is operable of measuring at least one of a spectrophotometry, spectroscopy, and refractive index of the molecular substances of the reservoir fluid.

Clause 8, the in-situ reservoir fluid analysis system of any of clauses 1-7, wherein the first seal is a bulbous that is detachably attached to the first sealable end.

Clause 9, the in-situ reservoir fluid analysis system of any of clauses 1-8, wherein the second seal is an inverted T-shaped seal.

Clause 10, the in-situ reservoir fluid analysis system of any of clauses 1-9, wherein the second sealable end comprises a guide that guides the capillary tube to a portion of the second seal, and wherein the second seal is removed after the capillary tube comes into contact with the second seal.

Clause 11, the in-situ reservoir fluid analysis system of any of clauses 1-10, wherein the molecular substance of the reservoir fluid is asphaltene.

Clause 12, the in-situ reservoir fluid analysis system of any of clauses 1-11, wherein the first insulating cylinder and the second insulating cylinder are formed from at least one of glass, PEEK, and Teflon.

Clause 13, a downhole tool, comprising: a first vial comprising: a first insulating cylinder having a first internal cavity for storing electrolytes; a capillary tube fixedly attached to the insulating cylinder; and a first sealable end comprising a first seal that prevents the electrolytes that are stored in the first internal cavity from flowing through the first sealable end while the first seal remains intact; and a second vial comprising: a second insulating cylinder having a second internal cavity for receiving the electrolytes that are stored in the first insulating cylinder; and a second sealable end comprising a second seal, wherein after the second seal is removed, the electrolytes stored in the first vial flow through the capillary tube, and into the second vial; and an actuator that drives the first vial towards the second vial.

Clause 14, the downhole tool of clause 13, further comprising a current source, wherein current supplied by the current source causes the molecular substances of the reservoir fluid to deposit onto the electrolytes.

Clause 15, a method to perform an in-situ reservoir fluid analysis of a reservoir fluid, comprising: deploying an in-situ reservoir fluid analysis system proximate reservoir fluid flowing in a wellbore of a well, the in-situ reservoir fluid analysis system comprising: a first vial comprising: a first insulating cylinder having a first internal cavity; electrolytes that are stored in the first insulating cylinder; a capillary tube fixedly attached to the insulating cylinder; and a first sealable end comprising a first seal; and a second vial comprising: a second insulating cylinder having a second internal cavity; and a second sealable end comprising a second seal; removing the first seal after the in-situ reservoir fluid analysis system is deployed in the wellbore to allow the reservoir fluid to flow into the capillary tube; driving the electrolytes that are stored in the first insulating cylinder to come into contact with the reservoir fluid in the capillary tube; initiating electro-deposition of molecular substances of the reservoir fluid to the electrolytes; removing the second seal after an amount of molecular substances of the reservoir fluid has been deposited onto the electrolytes; and migrating the electrolytes having the molecular substances into the second vial; and measuring properties of the molecular substances while the in-situ reservoir fluid analysis system is deployed in the wellbore.

Clause 16, the method of clause 15, wherein initiating the electro-deposition of molecular substances of the reservoir fluid to the electrolytes comprises applying a current to the electrolytes to cause the molecular substances of the reservoir fluid to deposit onto the electrolytes.

Clause 17, the method of clause 15 or 16, further comprising driving the first vial towards the second vial, wherein the second seal is removed after the capillary tube comes into contact with the second seal.

Clause 18, the method of any of clauses 15-17, wherein migrating the electrolytes having the molecular substances into the second vial comprises applying an electrical charge to the electrolytes to generate a potential difference between the first vial and the second vial, wherein the electrolytes migrate from the first vial to the second vial due to the potential difference.

Clause 19, the method of any of clauses 15-18, wherein migrating the electrolytes comprises applying a physical force to drive the electrolytes having the molecular substances into the second vial.

Clause 20, the method of any of clauses 15-19, further comprising migrating the electrolytes having the molecular substances from the second vial back to the first vial, wherein measuring properties of the molecular substances comprises measuring the properties of the molecular substances of the electrolytes after the electrolytes have partially migrated to the first vial.

Although certain embodiments disclosed herein describes transmitting electrical currents from electrodes deployed on an inner string to electrodes deployed on an outer string, one of ordinary skill would understand that the subject technology disclosed herein may also be implemented to transmit electrical currents from electrodes deployed on the outer string to electrodes deployed on the inner string.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:

1. An in-situ reservoir fluid analysis system deployed in a wellbore of a well, the in-situ reservoir fluid analysis system comprising:
    a first vial comprising:
        a first insulating cylinder having a first internal cavity for storing electrolytes;
        a capillary tube fixedly attached to the insulating cylinder; and
        a first sealable end comprising a first seal that prevents the electrolytes that are stored in the first internal cavity from flowing through the first sealable end while the first seal remains intact, wherein after the first seal is removed, molecular substances of a reservoir fluid in the capillary tube are deposited onto the electrolytes that are stored in the first internal cavity; and
    a second vial comprising:
        a second insulating cylinder having a second internal cavity for receiving the electrolytes that are stored in the first insulating cylinder; and
        a second sealable end comprising a second seal, wherein after the second seal is removed, the electrolytes stored in the first vial flow through the capillary tube, and into the second vial.

2. The in-situ reservoir fluid analysis system of claim 1, further comprising a tube positioned between the first vial and the second vial, wherein the tube provides at least one fluid flow path between the first vial and the second vial, wherein the at least one fluid flow path comprises:
    a first fluid flow path for a reservoir fluid sample to the capillary tube after the first seal is removed, wherein molecular substances of the reservoir fluid are deposited on the electrolytes that are stored in the first internal cavity after the reservoir fluid comes into contact with the electrolytes that are stored in the first internal cavity; and
    a second fluid flow path for the electrolytes that are stored in the first internal cavity to flow into the second insulating cylinder after the molecular substances of the reservoir fluid are deposited on the electrolytes that are stored in the first internal cavity and after the second sealable end is partially removed.

3. The in-situ reservoir fluid analysis system of claim 1, further comprising an actuator that drives the first vial towards the second vial, wherein the first seal and the second seal are removed after the first vial is driven towards the second vial.

4. The in-situ reservoir fluid analysis system of claim 3, wherein the actuator comprises electrodes cast in silicone piston.

5. The in-situ reservoir fluid analysis system of claim 1, further comprising a current source, wherein current supplied by the current source causes the molecular substances of the reservoir fluid to deposit onto the electrolytes.

6. The in-situ reservoir fluid analysis system of claim 1, further comprising at least one sensor operable to measure the molecular substances of the reservoir fluid.

7. The in-situ reservoir fluid analysis system of claim 6, wherein the at least one sensor is operable of measuring at least one of a spectrophotometry, spectroscopy, and refractive index of the molecular substances of the reservoir fluid.

8. The in-situ reservoir fluid analysis system of claim 1, wherein the first seal is a bulbous shaped seal that is detachably attached to the first sealable end.

9. The in-situ reservoir fluid analysis system of claim 1, wherein the second seal is an inverted T-shaped seal.

10. The in-situ reservoir fluid analysis system of claim 1, wherein the second sealable end comprises a guide that guides the capillary tube to a portion of the second seal, and wherein the second seal is removed after the capillary tube comes into contact with the second seal.

11. The in-situ reservoir fluid analysis system of claim 1, wherein the molecular substance of the reservoir fluid is asphaltene.

12. The in-situ reservoir fluid analysis system of claim 1, wherein the first insulating cylinder and the second insulating cylinder are formed from at least one of glass, PEEK, and Teflon.

13. A downhole tool, the downhole tool comprising:
a first vial comprising:
a first insulating cylinder having a first internal cavity for storing electrolytes;
a capillary tube fixedly attached to the insulating cylinder; and
a first sealable end comprising a first seal that prevents the electrolytes that are stored in the first internal cavity from flowing through the first sealable end while the first seal remains intact; and
a second vial comprising:
a second insulating cylinder having a second internal cavity for receiving the electrolytes that are stored in the first insulating cylinder; and
a second sealable end comprising a second seal, wherein after the second seal is removed, the electrolytes stored in the first vial flow through the capillary tube, and into the second vial; and
an actuator that drives the first vial towards the second vial.

14. The downhole tool of claim 13, further comprising a current source, wherein current supplied by the current source causes the molecular substances of the reservoir fluid to deposit onto the electrolytes.

15. A method to perform an in-situ reservoir fluid analysis of a reservoir fluid, the method comprising
deploying an in-situ reservoir fluid analysis system proximate reservoir fluid flowing in a wellbore of a well, the in-situ reservoir fluid analysis system comprising:
a first vial comprising:
a first insulating cylinder having a first internal cavity;
electrolytes that are stored in the first insulating cylinder;
a capillary tube fixedly attached to the insulating cylinder; and
a first sealable end comprising a first seal; and
a second vial comprising:
a second insulating cylinder having a second internal cavity; and
a second sealable end comprising a second seal;
removing the first seal after the in-situ reservoir fluid analysis system is deployed in the wellbore to allow the reservoir fluid to flow into the capillary tube;
driving the electrolytes that are stored in the first insulating cylinder to come into contact with the reservoir fluid in the capillary tube;
initiating electro-deposition of molecular substances of the reservoir fluid to the electrolytes;
removing the second seal after an amount of molecular substances of the reservoir fluid has been deposited onto the electrolytes; and
migrating the electrolytes having the molecular substances into the second vial; and
measuring properties of the molecular substances while the in-situ reservoir fluid analysis system is deployed in the wellbore.

16. The method of claim 15, wherein initiating the electro-deposition of molecular substances of the reservoir fluid to the electrolytes comprises applying a current to the electrolytes to cause the molecular substances of the reservoir fluid to deposit onto the electrolytes.

17. The method of claim 15, further comprising driving the first vial towards the second vial, wherein the second seal is removed after the capillary tube comes into contact with the second seal.

18. The method of claim 15, wherein migrating the electrolytes having the molecular substances into the second vial comprises applying an electrical charge to the electrolytes to generate a potential difference between the first vial and the second vial, wherein the electrolytes migrate from the first vial to the second vial due to the potential difference.

19. The method of claim 15, wherein migrating the electrolytes comprises applying a physical force to drive the electrolytes having the molecular substances into the second vial.

20. The method of claim 15, further comprising migrating the electrolytes having the molecular substances from the second vial back to the first vial, wherein measuring properties of the molecular substances comprises measuring the properties of the molecular substances of the electrolytes after the electrolytes have partially migrated to the first vial.

* * * * *